United States Patent
Müller et al.

(10) Patent No.: US 6,550,451 B1
(45) Date of Patent: Apr. 22, 2003

(54) METHOD OF ESTIMATING RESIDUAL EXHAUST GAS CONCENTRATION IN A VARIABLE CAM PHASE ENGINE

(75) Inventors: Martin Müller, Ann Arbor, MI (US); Jeffrey M. Pfeiffer, Walled Lake, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/162,375

(22) Filed: Jun. 4, 2002

(65) Prior Publication Data (65)

(51) Int. Cl.⁷ .................................................. F02P 5/00
(52) U.S. Cl. .............................................. 123/406.45
(58) Field of Search ....................... 123/406.45, 406.11, 123/406.12, 434

(56) References Cited

U.S. PATENT DOCUMENTS 5,904,129 A * 5/1999 Kadota ................. 123/406.45
5,970,947 A * 10/1999 Iida et al. ................... 123/295

* cited by examiner

Primary Examiner—Bibhu Mohanty
(74) Attorney, Agent, or Firm—Vincent A. Cichosz

(57) ABSTRACT

A method of estimating the concentration of residual exhaust gas in an internal combustion engine having variable cam phase control is based on engine dynamometer and engine simulator data. Since both the volumetric efficiency and the residual exhaust gas concentration of an engine vary monotonically in response to changes in cam phase, the simulated residual concentration data is deemed to be reliable if the simulated volumetric efficiency data matches volumetric efficiency data determined by engine dynamometer testing. Volumetric efficiency test data is compared to simulated volumetric efficiency data, and the simulation software is tuned until the simulated data matches the test data. At such point, the simulated residual concentration data is deemed to be reliable, and is used to calibrate a model relating residual concentration to cam phase angle, and such model is then used by an engine controller to estimate residual exhaust gas concentration during operation of the engine.

5 Claims, 2 Drawing Sheets

METHOD OF ESTIMATING RESIDUAL EXHAUST GAS CONCENTRATION IN A VARIABLE CAM PHASE ENGINE

TECHNICAL FIELD

This invention relates to the control of an internal combustion engine having variable cam phasing, and more particularly to a method of estimating the concentration of residual exhaust gas in an engine cylinder for engine control purposes.

BACKGROUND OF THE INVENTION

Accurate control of engine fuel injection and spark timing requires knowledge of the concentration of exhaust gas in the engine cylinders during the combustion stroke. Such exhaust gases may be present either due to external recirculation in which an EGR valve establishes a variably restricted passage between the engine intake and exhaust manifolds, and/or internal (i.e., residual) recirculation in which the timing of the intake and exhaust valve openings permits a portion of the exhaust gases to remain in the engine cylinders. The concentration of exhaust gas due to external recirculation can be estimated fairly reliably based on the EGR valve position and the gas pressures in the intake and exhaust manifolds. On the other hand, the concentration of residual exhaust gas due to internal recirculation is difficult to reliably estimate, particularly when the engine is equipped with a mechanism for adjusting the phase of the intake and/or exhaust valve timing since such adjustment alters the breathing characteristics of the engine. For this reason, engine control functions that are sensitive to the cylinder exhaust gas concentration topically include various gains and/or offsets that are calibrated to compensate for the effects of residual exhaust gas. However, this approach is not particularly desirable since separate calibration values are required for each such control function, and a fairly intensive effort is required to tune the several calibration values for a given engine. Theoretically, the calibration effort could be greatly simplified by directly estimating the concentration of residual exhaust gas (using test data obtained from engine dynamometer testing or software simulation, for example), but such data is difficult to measure and subject to open-loop simulation error. Accordingly, what is needed is a reliable and easily calibrated technique for directly estimating the concentration of residual exhaust gas based on engine dynamometer data and engine simulation data.

SUMMARY OF THE INVENTION

The present invention is directed to an improved method of estimating the concentration of residual exhaust gas in an internal combustion engine having variable cam phase control based on engine dynamometer and software simulation data. Essentially, the invention recognizes that both the volumetric efficiency and the residual exhaust gas concentration of an engine vary monotonically in response to changes in cam phase, and that the simulated residual concentration data will be reliable if the simulated volumetric efficiency data matches volumetric efficiency data determined by engine dynamometer testing. Thus, volumetric efficiency test data is compared to simulated volumetric efficiency data, and the simulation software is tuned until the simulated data matches the test data. At such point, the simulated residual concentration data is deemed to be reliable, and is used to calibrate a model relating residual concentration to cam phase angle, and such model is then used by an engine controller to estimate residual exhaust gas concentration during operation of the engine.

DESCRIPTION OF THE PREFERRED EMBODIMENT

Figure 1:
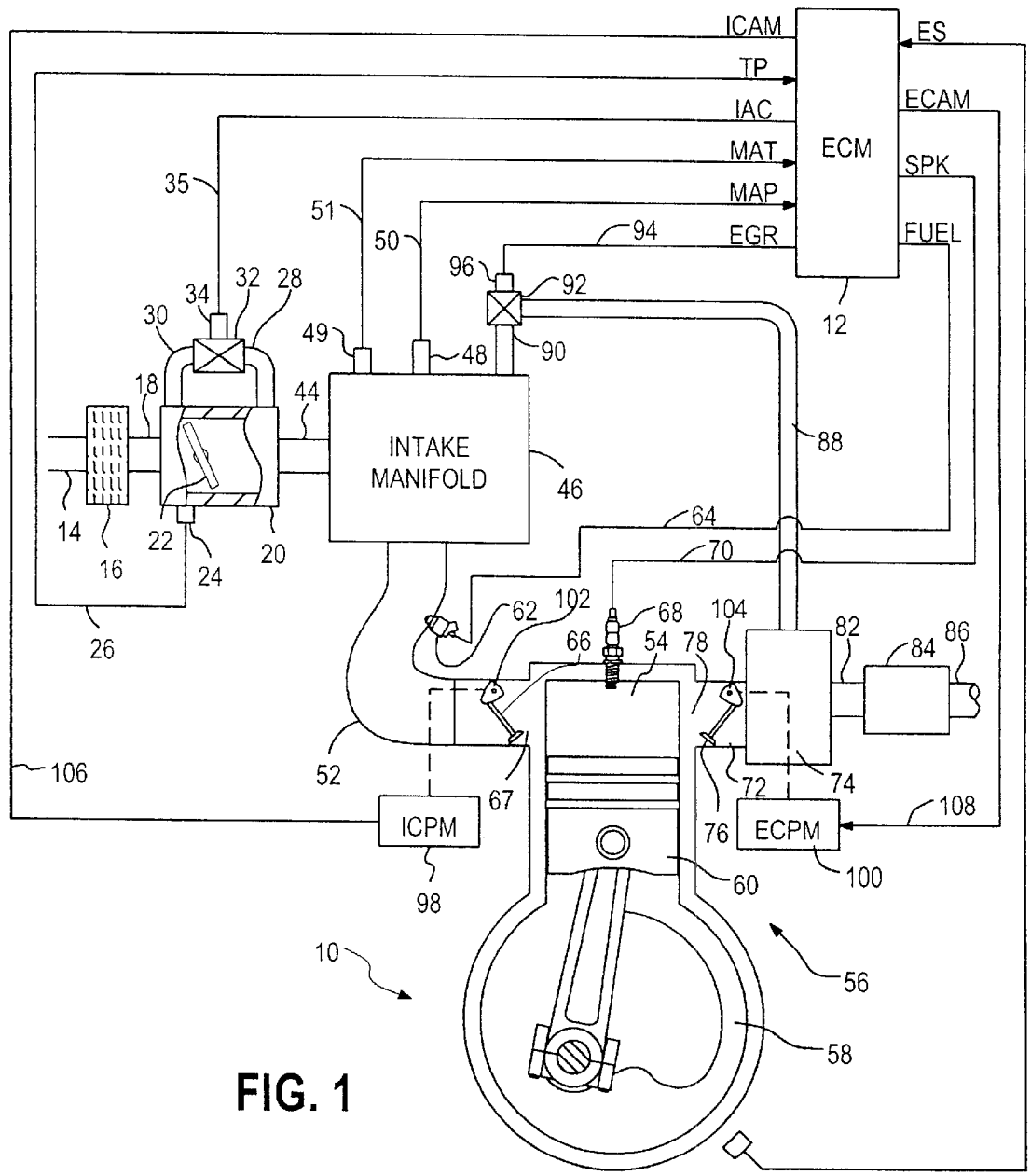
FIG. 1 is a schematic diagram of an internal combustion engine having intake and exhaust cam phase adjustment mechanisms and a microprocessor-based engine control unit programmed according to this invention.

Referring to the drawings, and particularly to FIG. 1, the reference numeral 10 generally designates a four-stroke internal combustion engine controlled by a microprocessor-based engine control module (ECM) 12. Inlet air at atmospheric pressure passes through fresh air inlet 14, air cleaner 16 and intake duct 18 into throttle body 20. A throttle plate 22 rotatably disposed in the throttle body, 20 is manually or electronically positioned to vary restriction to the inlet air. The position of throttle plate 22 is detected by the sensor 24, which provides a throttle position signal (TP) to ECM 12 on line 26. A portion of inlet air is routed past throttle plate 22 through conduits 28 and 30 and a conventional idle air bypass valve 32. The bypass valve 32 is positioned by a stepper motor 34, and the ECM 12 supplies an idle air control (IAC) signal on line 35 to stepper motor 34 during engine idle for purposes of maintaining a desired engine idle speed. Airflow out of throttle body 20 is coupled through intake duct 44 into the intake manifold plenum volume 46 (referred to hereinafter simply as the intake manifold). Conventional pressure and temperature transducers 48 and 49 are exposed to gas pressure in the intake manifold 46 and provide manifold absolute pressure and temperature signals (IMAP, IMAT) to ECM 12 via lines 50 and 51, respectively. Individual cylinder intake runners 52 couple intake manifold 46 to the combustion chambers 54 of respective engine cylinders 56, only one cylinder 56 being shown in FIG. 1. Each combustion chamber 54 is separated from the engine crankcase 58 by a respective piston 60 which engages the inside wall of the respective cylinder. A quantity of fuel is injected via conventional fuel injector 62 in response to a fuel injection command signal (FUEL) from ECM 12 on line 64. In the illustrated embodiment, the fuel mixes with the inlet air and is drawn into the combustion chamber 54 during an intake event when a cam-operated intake valve 66 opens an intake port 67. The air-fuel mixture is ignited in the combustion chamber 54 during a combustion event initiated by a timed spark across the spaced electrodes of spark plug 68, which is controlled by ECM 12 via a spark control signal (SPK) line 70. Gasses produced during the combustion event are released into exhaust runner 72 and exhaust manifold 74 during an exhaust event when a cam-operated exhaust valve 76 opens an exhaust port 78. The exhaust gasses pass through the exhaust manifold 74 to an exhaust duct 82 leading to catalytic converter 84 and tailpipe 86. A portion of the exhaust gasses are drawn from exhaust manifold 74 through conduits 88, 90 and exhaust gas recirculation (EGR) valve 92 into the intake manifold 46 for mixing with inlet air for deliver) to the cylinder combustion chambers 54. The ECM 12 issues an EGR control signal (EGR) on line 94 for positioning the EGR valve 92 with solenoid or stepper motor 96 to vary the dilution of the fresh inlet air with exhaust gasses for improved emission control and fuel economy.

The engine 10 is additionally equipped with intake and exhaust cam phase adjustment mechanisms 98 and 100 coupled to intake and exhaust camshafts 102, 104 for varying the phase or timing of the intake and exhaust valves 66, 76 relative to the base camshaft timing. Alternatively of course, intake and exhaust valve phase variation may be effectively achieved With direct electro-hydraulic valve actuation in so-called cam-less engines. The ECM 12 issues intake and exhaust cam phase control signals ICAM, ECAM to cam phase mechanisms 98 and 100 via lines 106 and 108, respectively, to alter the breathing characteristics of engine 10 for achieving exhaust gas emission reduction and engine performance improvement.

In the illustrated embodiment, the intake and exhaust cam phases are identically controlled to effect a so-called dual-equal control. In other implementations, one of intake and exhaust cam phases is maintained fixed while the other is adjusted to effect so-called intake-only or exhaust-only control, or the intake and exhaust cam phases can be independently controlled to effect a so-called dual-independent control.

As indicated above, accurate fuel and spark control of the engine 10 requires accurate estimation of the concentration of exhaust gas in the engine combustion chambers 54 during the combustion stroke. While the concentration of exhaust gas due to activation of the EGR valve 92 can be reliably estimated based on the activation duty cycle or the like and the pressure ratio across the valve 92, it has heretofore been difficult to reliably estimate the concentration of residual exhaust gas due to overlap of the intake and exhaust valves 66, 76. Since direct measurement of the residual concentration is typically not available for validating engine simulator data, engine software calibrators typically set up calibration values to compensate various engine control functions for the effects residual exhaust gas. However, the present invention recognizes that both the volumetric efficiency, and the residual exhaust gas concentration of an engine vary monotonically in response to changes in cam phase, and that simulated residual concentration data will be reliable if the simulated volumetric efficiency data matches volumetric efficiency data that is independently and reliably determined. In particular, the volumetric efficiency, defined as the ratio of the air volume ingested into the combustion chambers 54 to the swept volume of the pistons 60, varies inversely with respect to the residual exhaust gas concentration as the engine cam phase is adjusted. Fortunately, the volumetric efficiency $\eta_V$ can be reliably determined during engine dynamometer testing by applying measured values (intake airflow $m_{a,meter}$, engine speed RPM, atmospheric pressure $P_a$, and intake manifold air temperature and pressure $T_m$, $P_m$) and known values (swept volume $V_{cylinder}$) to the standard speed-density equation:

$$\eta_v = \frac{2 \cdot \left( \frac{[m_{a,meter} \ (kg/s)]}{N_{cylinders}} \right) \cdot ([T_m \ (C.)] + 273.15) \cdot [287 \ (J/kgK)]}{[V_{cylinder} \ (m^3)] \cdot [P_m \ (Pa)] \cdot \left[ \frac{RPM}{60} \right]}$$

Alternatively, the volumetric efficiency $\eta_v$ can be reliably estimated as described, for example, in the U.S. Pat. No. 5,714,683, issued on Feb. 3, 1998, and incorporated herein by reference. If the simulated volumetric efficiency data does not match the measured or estimated volumetric efficiency data, the engine simulation software parameters can be tuned until the simulated data matches the test data across the range of expected cam phase adjustment. Once the simulated volumetric efficiency data matches the corresponding test data, the simulated residual concentration data is deemed to be reliable due to the relationship between volumetric efficiency and residual concentration, and the simulated residual concentration is used to calibrate a model (such as a second or third order mathematical model) relating residual concentration to cam phase angle. The model, in turn, is stored in ECM 12, and used during operation of the engine 10 to maintain a running estimate of the residual exhaust gas concentration for use by the fuel and spark timing control algorithms.

Figure 2:
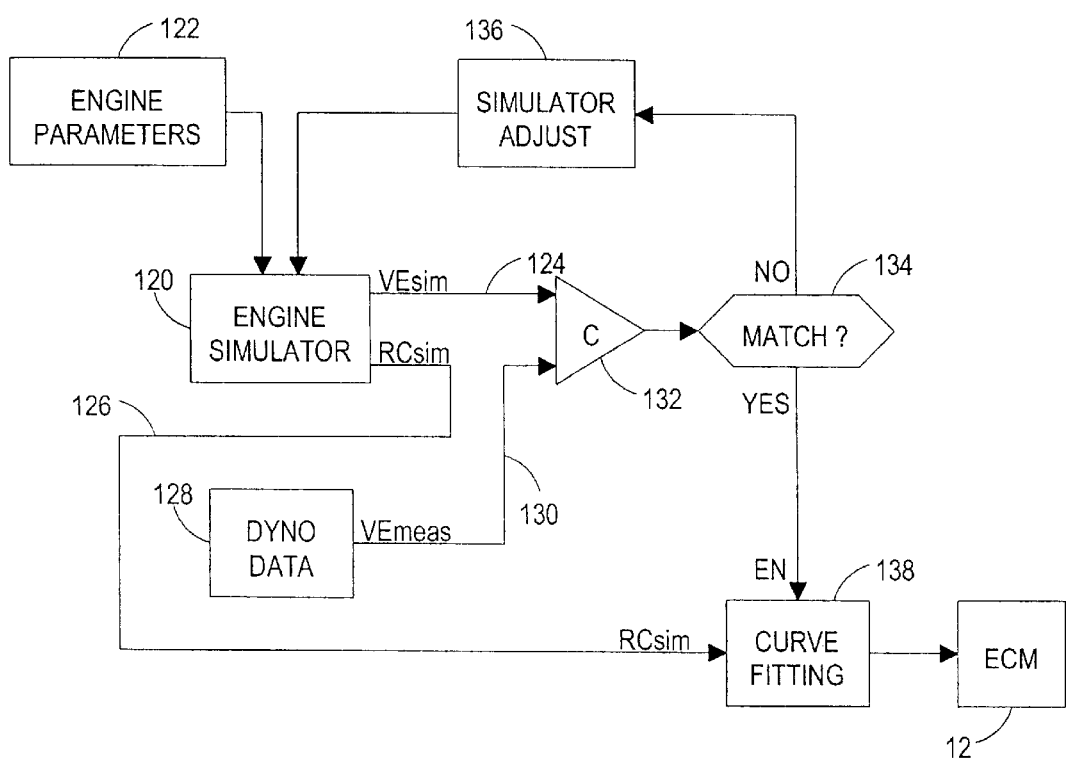
FIG. 2 is a block diagram illustrating the method of this invention.

The block diagram of FIG. 2 illustrates the above-described process. The first phase of the process occurs during engine control algorithm calibration in a laboratory test setting. In this phase, engine characteristics and parameters are customarily determined either by data measurement from an operational engine (or vehicle) coupled to a dynamometer, or by executing an engine simulation software package such as Gamma Technologies' GT Power suite, or the like on a lab computer. The measured or simulated data is then used to calibrate the engine control functions so as to optimize the engine performance and/or fuel economy, without exceeding specified exhaust emission levels. In the case of the present invention, the engine simulation software is configured to simulate both the volumetric efficiency and the residual exhaust gas concentration, and measured engine data is used to independently determine the volumetric efficiency as described above. Thus, FIG. 2 depicts an engine simulator 120 programmed to simulate the operation of engine 10 based on eternally supplied engine geometry parameters 122, and in particular, to output the simulated volumetric efficiency $VE_{sim}$ and the simulated residual exhaust gas concentration $RC_{sim}$ on lines 124 and 126, respectively. The measured engine data, depicted by block 128, is used to develop the measured volumetric efficiency $VE_{meas}$ on line 130, and a comparator 132 compares the $VE_{sim}$ to $VE_{meas}$ as for various values of cam phase angle. If $VE_{sim}$ in does not match $VE_{meas}$ within a specified deviation window, the decision block 134 is answered in the negative, and the block 136 adjusts or tunes certain parameters of engine simulator 120 (such as an exhaust backpressure parameter) so that $VE_{sim}$ will more nearly agree with $VE_{meas}$. When the constraints of decision block 134 are satisfied over the expected range of cam phase variation, it is answered in the affirmative, enabling the Curve Fitting block 138 to utilize $RC_{sim}$ to select coefficients of a suitable mathematical model of residual concentration as a function of cam phase. For example, in a mechanization of the present invention, the modeled residual concentration $RC_{mod}$ is represented by a quadratic equation of the form:

$$RC_{mod} = RC_o + (a_1 * x) + (a_2 * x^2)$$

where $RC_o$ is the residual concentration that occurs with a base setting of the cam phase, x is the cam phase angle, and the coefficients $a_1$ and $a_2$ are selected so that $RC_{mod}$ best represents the $RC_{sim}$ output of simulator 120 for the various values of cam phase angle x. The block 138 may, employ a least-squares curve fitting techniques, although it will be recognized that other techniques may be used as well. Finally, the model created by block 138 is transferred to the ECM 12, which uses the model to maintain a running estimate of the residual exhaust gas concentration during operation of engine 10 for use by the fuel and spark timing control algorithms.

In summary, the present invention provides a very practical methodology for estimating the residual exhaust gas concentration of an internal combustion engine having variable cam phase. While described in reference to the illustrated embodiment, it is expected that various modifications in addition to those mentioned above will occur to those skilled in the art. For example, look-up tables may be used in place of a mathematical algorithm to model the residual concentration, and so on. Thus, it will be understood that methods incorporating these and other modifications may fall within the scope of this invention, which is defined by the appended claims.

What is claimed is:

1. A method of estimating a concentration of residual exhaust gas in an internal combustion engine, where the engine includes variable phase control of one or more valves that control a flow of gases through said engine, the method comprising the steps of:

determining a volumetric efficiency of said engine based on known and measured engine parameters for various values of said phase control;

simulating the volumetric efficiency and the residual exhaust gas concentration for the various phase control values using an engine simulator;

comparing the determined volumetric efficiency with the simulated volumetric efficiency for the various phase control values, and adjusting at least one parameter of said engine simulator until the simulated volumetric efficiency substantially matches the determined volumetric efficiency;

modeling the residual exhaust gas concentration of said engine as a function of the various phase control values based on the simulated residual exhaust gas concentration; and estimating the concentration of residual exhaust gas in the engine during operation of the engine based on said modeled residual exhaust gas concentration.

2. The method of claim 1, wherein the volumetric efficiency of said engine is calculated based on known engine parameters and data measured during dynamometer testing of said engine.

3. The method of claim 1, including the step of adjusting an exhaust backpressure parameter of said engine simulator until the simulated volumetric efficiency substantially matches the determined volumetric efficiency.

4. The method of claim 1, including the step of mathematically modeling the residual exhaust gas concentration of said engine as a function of the various phase control values and a residual exhaust gas concentration that occurs with a base value of said phase control.

5. The method of claim 1, including the step of utilizing the estimated residual exhaust gas concentration to schedule one or more engine control parameters.

* * * * *